May 25, 1937.   H. H. HOLLY   2,081,455
MOLDING DEVICE
Filed Feb. 24, 1936
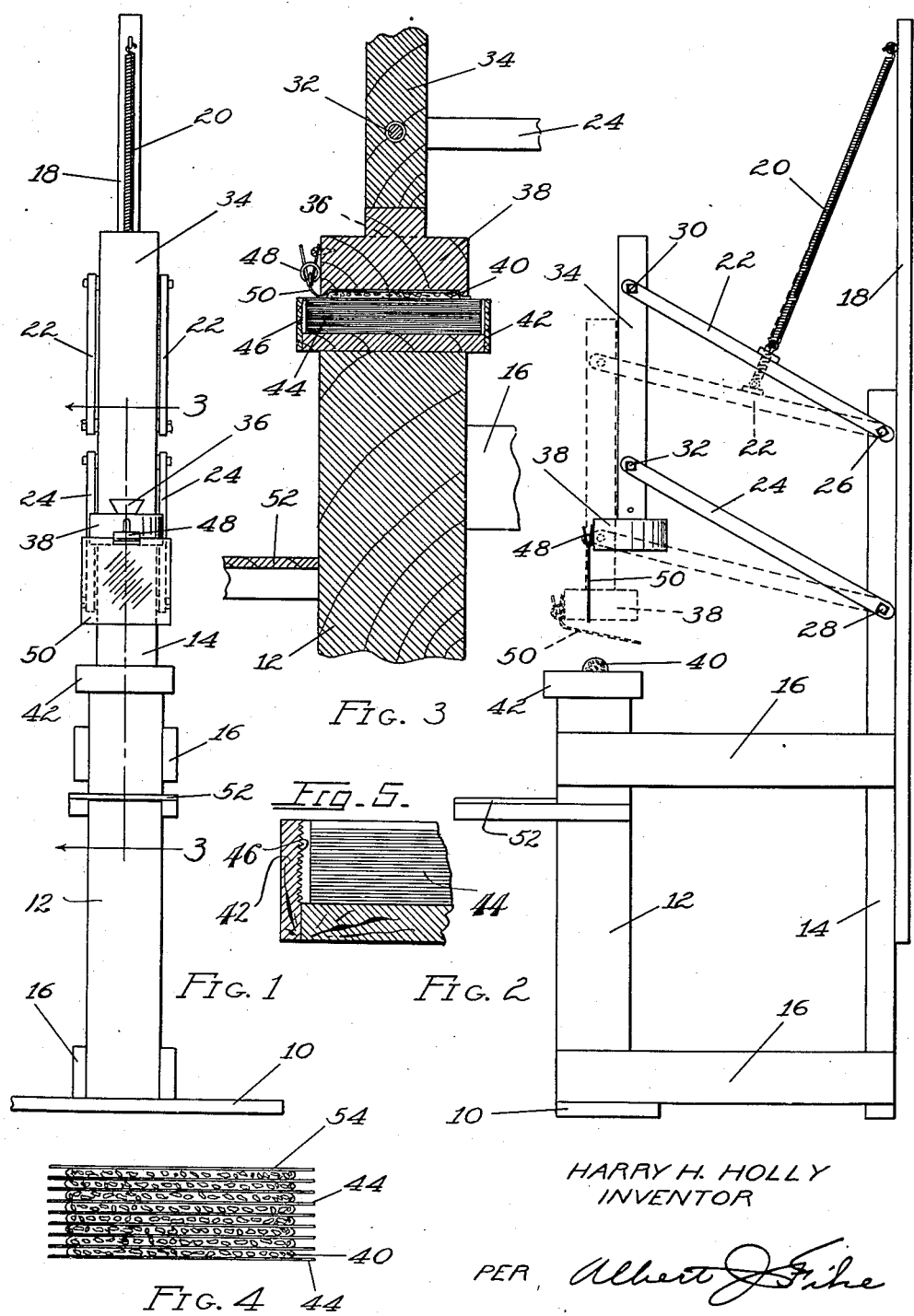
HARRY H. HOLLY
INVENTOR
PER, Albert J. Fike
ATTORNEY Patented May 25, 1937

2,081,455

UNITED STATES PATENT OFFICE 2,081,455

MOLDING DEVICE

Harry H. Holly, Chicago, Ill., assignor of one-half to Albert J. Fihe, Chicago, Ill.

Application February 24, 1936, Serial No. 65,380

7 Claims. (Cl. 107—8)

This invention relates to improvements in molding devices, and has for one of its principal objects, the provision of a device for molding or forming meat patties such as those used in sandwiches commonly known as "hamburgers" and also for various other products such as sausages or other comestibles.

One of the important objects of this invention is to provide a semi-automatic molding device for meats or the like, which shall, in addition to effecting a saving of considerable time and labor, also produce a uniform product and one which is more appetizing to the eye.

A further object of the invention resides in the provision of means for molding food products or the like which shall be quite desirable from a sanitary point of view, inasmuch as the food material is never touched by the hands of the operator, and which, furthermore, upon being completely formed or molded in the machine, is automatically deposited upon a sheet of waxed paper or the like which shall keep the same clean and fresh until used.

Another and still further important object of the invention is the provision in a meat molding machine or similar apparatus of means whereby a considerable saving in the use of paper or other wrappers will be effected.

Other and further important objects of the invention will be apparent from the disclosures in the accompanying drawing and following specification.

The invention, in a preferred form, is shown in the drawing and hereinafter more fully described.

In the drawing:

Figure 1 is a front elevation of the improved meat molding machine of this invention, illustrating a preferred embodiment thereof.

Figure 2 is a side elevation of the device, showing the operation in dotted lines.

Figure 3 is a sectional view of part of the apparatus taken on the line 3—3 of Figure 1 and showing the interior arrangement of parts and the positioning of same just after the molding or forming operation has been completed.

Figure 4 is a side elevation of the stacked completed products of the apparatus.

Figure 5 is an enlarged view of a portion of Figure 3.

As shown in the drawing:

The reference numeral 10 indicates generally the base of the improved molding machine of this invention, the same having uprights 12 and 14 connected by cross-pieces 16 to form a rigid structure, the upright 14 extending to a height greater than that of the element 12 and having an extension 18 which is considerably higher than the rest of the apparatus and from which depends a helical spring 20, this spring having its lower end connected to the uppermost bar of a pair of parallel elements 22 and 24, the inner ends of which are pivotally mounted at 26 and 28 respectively to the support 14. The outer ends of these pairs or links are pivoted at 30 and 32 respectively to a member 34 which is accordingly constrained to move in a path wherein it is at all times parallel to the support 14.

At the lower end of the element 34 is removably mounted, by means of a dovetailed groove or the like 36, a mold element 38 which has its outer face recessed as best shown in Figure 3 so as to receive and correspondingly shape a quantity of meat or other product 40 which is desired to be molded.

Mounted in an opposed relationship to the molding or forming head element 38 is a recessed structure 42 preferably square in cross-section and which is adapted to contain a plurality of correspondingly shaped and sized sheets of waxed paper as best shown at 44 in Figure 3. The forward face of this receptacle 42 is interiorly notched by horizontal grooves as at 46 in Figure 5 in order to prevent undesirable withdrawal of more than one sheet of paper at a time after the molding operation has been completed.

Mounted on the forward face of the mold element 38 is a clip or the like 48 adapted to removably support a sheet of waxed paper 50 which, when the head 38 is propelled downwardly preferably by a manual operation, is forced inwardly by the action of the downward movement against the air somewhat as illustrated in the dotted lines in Figure 2. A suitably gaged amount of meat or other product having been previously placed on the top of the stacked sheets of paper 44 in the receptacle 42, the molding head on its downward movement first forces the sheet of paper 50 inwardly and into position above the meat 40, and thence the head, continuing its downward motion, flattens the meat or other product between the sheet 50 and the uppermost sheet 44, making the molded product conform to the contour of the recess in the head 38. Upon upward movement of the head 38, due to the action of the spring 20, the sheet of paper 50 is pulled away from the molded meat leaving one of the lower sheets of paper 44 adhering to the under-face of the now molded material which is then placed upon an extension or shelf 52 of the framework 12. As the molding operation proceeds, the individual patties, each with a sheet of paper 44 adhering to its bottom, are stacked upon each other as best shown in Figure 4, preferably on the shelf 52 until a desired number have been formed, whereupon a final covering sheet of paper 54 is applied to the heap which can then be transferred to a refrigerator or other receptacle for storage until ready for use. In this manner, the molded patties are kept clean and fresh, and whenever one or more is desired for use, the same are taken from the receptacle, placed face down on a cooking element, the sheet of paper 44 pulled off, and the food has thus been prepared for cooking and is finally delivered to the consumer without having been once touched by human hands.

The sheet 50 is used over and over until such time as the operator may consider a replacement advisable, and in this way, only one sheet of paper is necessary for each patty while, at the same time, sticking of the material to the inner face of the mold or to any portion of the apparatus is absolutely and positively prevented.

The head or molding element 38 is made removable from the element 34 so that patties of various sizes, shapes and thicknesses can be produced in one machine simply by changing the recessed molding element, and it will be evident that herein is provided a means and mechanism for rapidly and easily producing a quantity of uniform meat patties or other molded products in a sanitary and economical manner, and it will be further evident that while the operation here is semi-automatic, the same could be readily altered to produce a fully automatic mechanism, as a measured quantity of material could be deposited on the platen 42 in some mechanical manner, and a motor or other driving mechanism could be employed to reciprocate the head and support 38—34 at intervals correspondingly spaced with the operations of depositing the material 40 on the platen or other portion of the mold. Furthermore, the use of air currents produced by the downward motion of the head to automatically force a sheet 50 into proper position with regard to the molding head and the product to be formed is considered quite a novel and useful expedient.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A mold, including a recessed element, a liner therefor, means for supporting the liner on the recessed element, an opposed support for material to be molded, and means for moving the recessed element downwardly and outwardly toward the support, which movement causes the mold liner to be blown into position under the recessed element.

2. A mold comprising a fixed lower receptacle, means for positioning a plurality of product supporting sheets in the receptacle, a molding head, a repeating liner for the head, and means for automatically removing the liner from the head and from each completed molded object while leaving a supporting sheet under the object.

3. A mold for plastic substances, comprising a fixed support, means for positioning a plurality of substance supporting sheets on the support, a molding head, a liner therefor, means for reciprocatively positioning the head above the support for a downward angular movement with respect thereto, and means for supporting the liner on the head by one edge, whereupon each molding movement blows the liner under the head.

4. A mold comprising a fixed support, means for positioning a plurality of sheets in the support, a molding head, means for reciprocatively positioning the head above the support, a mold lining sheet, and means for attaching said sheet along its upper edge to the forward outer portion of the molding head, whereby a downward and outward movement of the head causes the sheet to be blown under the head in lining position, said attaching means further operating to automatically remove said mold lining sheet from the upper face of the molded product upon the completion of the molding operation, and a subsequent upward and inward movement of the head.

5. A mold comprising a fixed support, means for positioning a purality of waxed sheets in the support, a molding head, means for reciprocatively positioning the head above the support, a mold lining means including a sheet of paper corresponding to the sheets in the support, and means for attaching said sheet of paper along its upper edge to the forward outer portion of the molding head, whereby a downward and outward movement of the head causes the sheet to be blown under the head in lining position, said paper attaching and head reciprocating means further operating to automatically remove said mold lining sheet of paper from the upper face of the molded product upon the completion of the molding operation, and a consequent upward movement of the molding head, and to thereupon position the lining sheet of the molding head for another and similar mold lining operation.

6. A mold, including a supporting framework, a molding platform on the framework, means for supporting a plurality of lining sheets on the platform, a rearward upward extension of the framework, a set of parallel links mounted on the framework, a reciprocating element pivotally connected to the forward ends of the links, a molding head removably mounted on the lower end of the reciprocating element, means for normally raising the reciprocating element, links and molding head into an inoperative position, and elements associated with the platform for preventing the withdrawal of more than one lining sheet with each completed object.

7. A patty mold, including a supporting framework, a molding platform on the framework, means for supporting a plurality of patty lining sheets on the platform, a molding head movable to and from the platform, elements associated with the platform for preventing the withdrawal of more than one lining sheet with each completed patty, a repeating liner for the head, and means on the head for supporting the liner by its upper end, whereby a downward and outward movement of the head causes the liner to be blown under the head.

HARRY H. HOLLY.